(12) United States Patent
Boström et al.

(10) Patent No.: US 12,441,397 B2
(45) Date of Patent: Oct. 14, 2025

(54) FEEDBACK CONTROL

(71) Applicant: Volvo Construction Equipment AB, Eskilstuna (SE)

(72) Inventors: Anders Boström, Tävelsås (SE); Gustav Strandberg, Växjö (SE)

(73) Assignee: Volvo Construction Equipment AB, Eskilstuna (SE)

( * ) Notice: Subject to any disclaimer, the term of this patent is extended or adjusted under 35 U.S.C. 154(b) by 94 days.

(21) Appl. No.: 18/441,641

(22) Filed: Feb. 14, 2024

(65) Prior Publication Data

US 2024/0308578 A1    Sep. 19, 2024

(30) Foreign Application Priority Data

Mar. 16, 2023    (EP) ..................................... 23162286

(51) Int. Cl.
*B62D 6/00* (2006.01)
*B62D 5/00* (2006.01)
*B62D 5/06* (2006.01)

(52) U.S. Cl.
CPC ............. *B62D 6/008* (2013.01); *B62D 5/005* (2013.01); *B62D 5/063* (2013.01)

(58) Field of Classification Search
CPC ........ B62D 6/008; B62D 5/005; B62D 5/063; B62D 5/006; B62D 5/091; B62D 5/30; B62D 5/06
See application file for complete search history.

(56) References Cited

U.S. PATENT DOCUMENTS

| 5,996,701 | A | * | 12/1999 | Fukasawa | E02F 9/2235 701/50 |
|---|---|---|---|---|---|
| 9,050,999 | B2 | | 6/2015 | Kuipers et al. | |
| 10,800,445 | B2 | | 10/2020 | Longuemare et al. | |
| 11,167,791 | B2 | | 11/2021 | Takenaka et al. | |
| 2004/0211618 | A1 | | 10/2004 | Ogawa et al. | |
| 2012/0043154 | A1 | * | 2/2012 | Bitter | F15B 11/162 180/442 |
| 2014/0343697 | A1 | | 11/2014 | Kuipers | |
| 2021/0001930 | A1 | * | 1/2021 | Ognibene | B62D 5/062 |

FOREIGN PATENT DOCUMENTS

| CN | 116443097 | A | * | 7/2003 | ............. B62D 5/091 |
|---|---|---|---|---|---|
| DE | 19650475 | C1 | | 4/1998 | |
| WO | WO-2006006448 | A1 | * | 1/2006 | ............. E02F 9/225 |
| WO | WO-2006016653 | A1 | * | 2/2006 | ............. F04B 49/00 |

OTHER PUBLICATIONS

European Search Report for European Patent Application No. 23162286.1, mailed Aug. 31, 2023, 7 pages.

* cited by examiner

*Primary Examiner* — Joseph J Dallo
(74) *Attorney, Agent, or Firm* — Sage Patent Group (57) ABSTRACT

A hydraulic steering system is presented. The system comprises a steering input unit, SIU, and a processing circuitry configured to control a haptic feedback exerted by the SIU. The processing circuitry is configured to obtain an available hydraulic steering capacity of the hydraulic steering system, and to control the haptic feedback exerted on the SIU based on the obtained hydraulic steering capacity.

20 Claims, 4 Drawing Sheets

FEEDBACK CONTROL

CROSS REFERENCE TO RELATED APPLICATION

This application claims priority to European Patent Application Number 23162286.1, filed on Mar. 16, 2023, the disclosure and content of which is incorporated by reference herein in its entirety.

TECHNICAL FIELD

The disclosure relates generally to steer-by-wire systems. In particular aspects, the disclosure relates to controlling a feedback torque of a vehicle. The disclosure can be applied to heavy-duty vehicles, such as trucks, buses, and construction equipment, among other vehicle types. Although the disclosure may be described with respect to a particular vehicle, the disclosure is not restricted to any particular vehicle.

BACKGROUND

Systems employing hydraulic steering are common in heavy-duty equipment in general. Hydraulic steering is generally governed by a hydraulic pump and a hydraulic system and control of the hydraulic steering is provided by control of the hydraulic pump and/or the hydraulic system.

A steering system of a road vehicle generally comprise transfer of a mechanical torque between a steering input unit (SIU) and a steering strut. This means that, depending on e.g. a force acting upon the steering strut via wheels of the vehicle and the road, a feedback torque will be provided to the SIU.

A hydraulic steering system of a heavy-duty equipment, specifically an articulated vehicle, is generally electronic. This means that there will be no torque autonomously provided to the SIU.

The feedback torque is advantageous as it e.g., prevents an operator of the SIU from rotating the SIU too fast. A correctly applied feedback torque assists the operator in controlling the vehicle in a safe and smooth manner.

From the above, it is clear that there is a need for improvements.

SUMMARY

According to a first aspect of the disclosure, a hydraulic steering system comprising a steering input unit, SIU, and a processing circuitry is presented. The processing circuitry is configured to control a haptic feedback exerted by the SIU. The processing circuitry is configured to obtain an available hydraulic steering capacity of the hydraulic steering system, and control the haptic feedback exerted on the SIU based on the obtained hydraulic steering capacity. The first aspect of the disclosure may seek to improve the haptic feedback provided by an SIU of a vehicle with a hydraulic steering system. A technical benefit may include reducing a risk that a current steering angle of the SIU is not reflected by a current steering angle of the vehicle.

In some examples, including in at least one preferred example, optionally, obtaining the available hydraulic steering capacity comprises obtaining hydraulic operational data of the hydraulic steering system, and determining the available hydraulic steering capacity based on the hydraulic operational data. This is advantageous as it enables a more accurate, safe and/or comfortable steering of a vehicle utilizing the hydraulic steering system.

In some examples, including in at least one preferred example, optionally, the hydraulic operational data comprises a current hydraulic power of the hydraulic steering system. This is advantageous as it enables a more accurate, safe and/or comfortable steering of a vehicle utilizing the hydraulic steering system.

In some examples, including in at least one preferred example, optionally, the hydraulic operational data comprises a current hydraulic flow of the hydraulic steering system. This is advantageous as it enables a more accurate, safe and/or comfortable steering of a vehicle utilizing the hydraulic steering system.

In some examples, including in at least one preferred example, optionally, the hydraulic operational data comprises a current speed of a hydraulic pump driving the hydraulic steering system. This is advantageous as it enables a more accurate, safe and/or comfortable steering of a vehicle utilizing the hydraulic steering system.

In some examples, including in at least one preferred example, optionally, the hydraulic steering system is a steer by wire (SBW) system. This is beneficial as SBW systems allows for precise control over steering, enabling operators to make smaller adjustments and fine-tune their steering inputs. SBW eliminates a need for a mechanical steering linkage, which may be heavy and take up valuable space in the vehicle's design. By using electronic signals to control the steering, the system can be much lighter and more compact, allowing for greater flexibility in vehicle design and reduced fuel consumption due to the reduced weight.

In some examples, including in at least one preferred example, optionally, control of the haptic feedback comprises controlling a torque exerted on the SIU.

In some examples, including in at least one preferred example, optionally, the processing circuitry is further configured to obtain environmental data and control the haptic feedback exerted on the SIU also based on the environmental data. The environmental data comprises one or more of a road condition, a weather condition and/or topology data. This is advantageous as it enables a more accurate, safe and/or comfortable steering of a vehicle utilizing the hydraulic steering system.

According to a second aspect, a vehicle is presented. The vehicle comprises a hydraulic steering system comprising a steering input unit, SIU, and a processing circuitry configured to control a haptic feedback exerted the SIU. The processing circuitry is configured to obtain an available hydraulic steering capacity of the vehicle, and to control the haptic feedback exerted on the SIU based on the obtained hydraulic steering capacity.

In some examples, including in at least one preferred example, optionally, the hydraulic steering system is the hydraulic steering system of the first aspect.

In some examples, including in at least one preferred example, optionally, the hydraulic steering system comprises at least one hydraulic pump arranged to be driven by a propulsion source of the vehicle.

In some examples, including in at least one preferred example, optionally, at least one hydraulic pump is driven proportionally to a ground speed of the vehicle and the hydraulic operational data comprises a current ground speed of the vehicle.

In some examples, including in at least one preferred example, optionally, at least one hydraulic pump is driven proportionally to a rotational speed of the propulsion source and the hydraulic operational data comprises a current rotational speed of the propulsion source.

In some examples, including in at least one preferred example, optionally, the vehicle is an articulated vehicle.

According to a third aspect, a method of determining a haptic feedback exerted by a SIU of a hydraulic steering system is presented. The method comprises obtaining an available hydraulic steering capacity of the vehicle, and controlling the haptic feedback exerted on the SIU based on the obtained hydraulic steering capacity.

In some examples, including in at least one preferred example, optionally, obtaining the available hydraulic steering capacity comprises obtaining hydraulic operational data of the hydraulic steering system, and determining the available hydraulic steering capacity based on the hydraulic operational data.

In some examples, including in at least one preferred example, optionally, the hydraulic operational data comprises at least one of a current hydraulic power of the hydraulic steering system, a current hydraulic flow of the hydraulic steering system and/or a current speed of a hydraulic pump driving the hydraulic steering system.

The disclosed aspects, examples, and/or accompanying claims may be suitably combined with each other as would be apparent to anyone of ordinary skill in the art. Additional features and advantages are disclosed in the following description, claims, and drawings, and in part will be readily apparent therefrom to those skilled in the art or recognized by practicing the disclosure as described herein.

There are also disclosed herein computer systems, control units, code modules, computer-implemented methods, computer readable media, and computer program products associated with the above discussed technical benefits.

BRIEF DESCRIPTION OF THE DRAWINGS

Examples are described in more detail below with reference to the appended drawings.

DETAILED DESCRIPTION

The detailed description set forth below provides information and examples of the disclosed technology with sufficient detail to enable those skilled in the art to practice the disclosure.

A feedback force of a steering in input unit (SIU) is a force operating in a reverse direction of a rotational force applied to the SIU. In a general vehicle, such as a car, there is a direct mechanical link for transfer of steering torque between the SIU and the wheels. This means that an inherent feedback force will be provided from the wheels to the SIU depending on e.g. a speed of the vehicle, road conditions etc. In a steer by wire system (SBW), there is no direct mechanical link for transfer of steering torque between the SIU and the wheels or tracks of the vehicle. In SBW systems, feedback torque to the SIU will be in the form of haptic feedback.

The form of the haptic feedback may depend on a type of SIU utilized. To exemplify, if the SIU is a steering wheel, the haptic feedback may be in the form a feedback torque. If the SIU is a joystick or other controlled, the haptic feedback may be in the form a feedback force.

Providing a correct haptic feedback to an SIU is important not only in order to facilitate control of the vehicle, but also to provide a good working environment for an operator of the vehicle. If a haptic feedback is too high, steering of the vehicle will be heavy, and the vehicle will be uncomfortable to operate. As mentioned, if the haptic feedback is too low, there is a risk of overcompensation of the steering causing unstable and shaky steering of the vehicle.

The steering of a heavy-duty vehicle is a safety critical function. An operator of a heavy-duty vehicle shall be in full control of steering of the vehicle at all times. The steering is advantageously such that the vehicle will react smoothly and responsively to input from the operator. Smoothness is advantageous as it provides an ergonomically sound working environment. Responsiveness is advantageous as it provides full control to the operator. However, smoothness and responsiveness may be contradictive for some use cases.

The inventors behind the present disclosure have identified the requirements of above and, through inventive thinking, realized that there is an opportunity to determine haptic feedback in a hydraulic steering system in a manner that is improved or, at least different, from how haptic feedback has been previously determined. To this end, the present disclosure is concerned with haptic feedback of hydraulic steering systems.

A haptic feedback of a SBW system generally depends on the rotation speed of the SIU. For this to be sufficient, the hydraulic steering system is assumed to always have a same steering capacity, which is not the case. For instance, when an engine driving a hydraulic pump of a hydraulic steering system in a vehicle is running at idle speed, a maximum hydraulic power is generally lower compared to higher engine speed. In this example, the vehicle will have a reduced maximum articulation speed. If the haptic feedback, i.e. a feedback force, of the SIU is not sufficiently high, the vehicle will rotate slower than the SIU indicates. In other words, a current steering angle indicated by the SIU will differ from a current steering angle of the vehicle. To include a factor indicating an available hydraulic steering capacity (e.g. engine speed and vehicle velocity for this example) when calculating the haptic feedback may be beneficial in order to sufficiently counteract rotation of the SIU when the available hydraulic steering capacity is low. Generally, a haptic feedback provided to an SIU of an SBW system is determined as a function of a difference between a current angle of the SIU and a current articulation angle of the vehicle. This methodology is blunt and does not provide an accurate haptic feedback.

When operating an articulated vehicle at high velocities, it is important that the SIU is stabilized to not cause any fast and dangerous articulations. The feedback force of the SIU should therefore also be dependent on the vehicle velocity to increase the feedback force when accelerating.

Figure 1A:
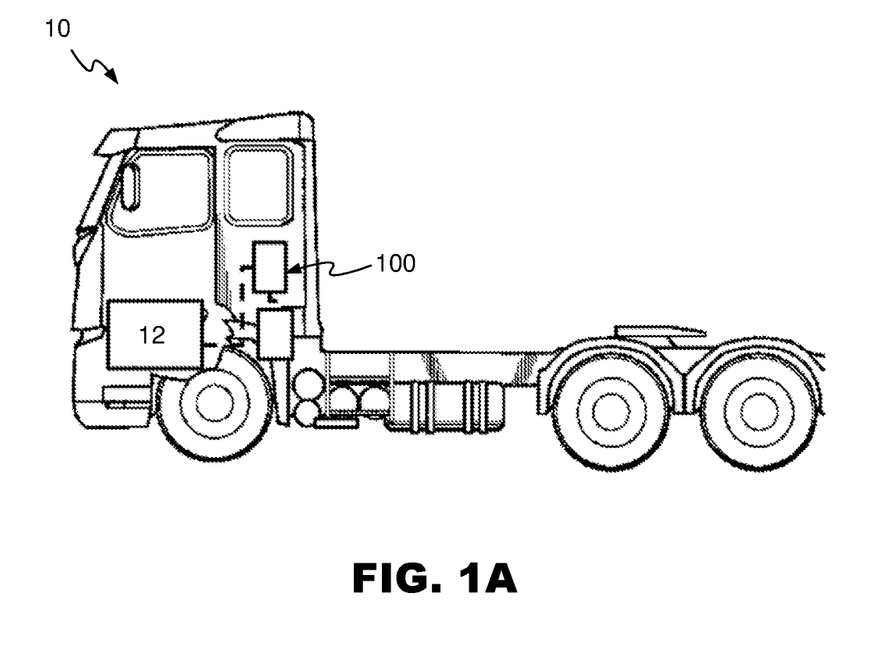
FIG. 1A is an exemplary vehicle according to an example.

The teachings may be applied to any vehicle utilizing a hydraulic steering system exemplified by the heavy-duty vehicle 10 in the form a truck shown in FIG. 1A. The vehicle 10 comprises at least one propulsion source 12. The propulsion source 12 may be an engine and/or a motor arranged to propel the vehicle 10. The vehicle 10 according to the present disclosure further comprises a hydraulic steering system 100. The hydraulic steering system 100 is configured to control steering of the vehicle 10. The hydraulic steering system 100 will be further explained throughout the present disclosure.

Figure 1B:
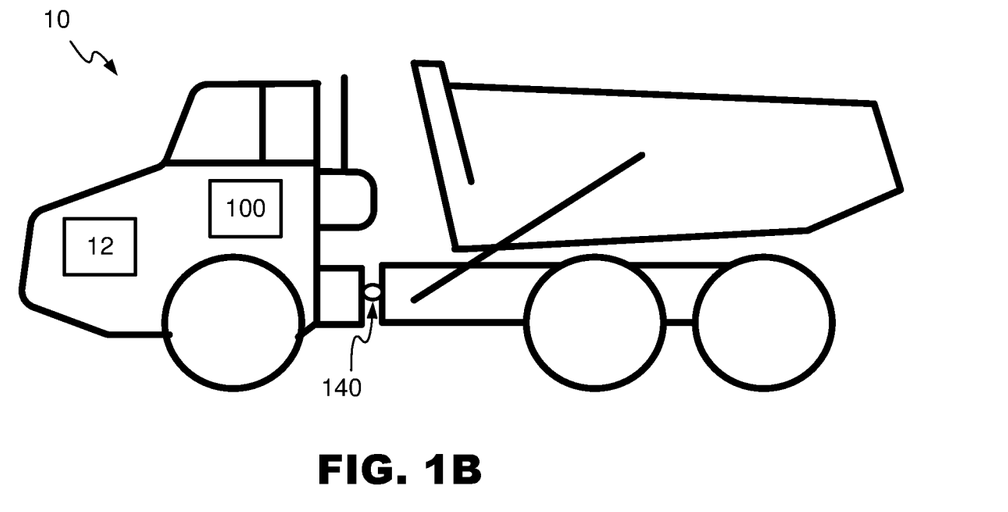
FIG. 1B is an exemplary vehicle according to an example.

In FIG. 1B, another example of the heavy-duty vehicle 10 is shown. In FIG. 1B, the heavy-duty vehicle 10 is an articulated vehicle. An articulated vehicle is a vehicle which has a permanent or semi-permanent pivot joint in its construction. This pivot joint allows the articulated vehicle to turn more sharply. There are many kinds of articulated vehicles e.g. heavy-duty equipment, buses, trams, trains etc. In FIG. 1B, the articulated vehicle is exemplified by an articulated hauler. When articulated vehicles are mentioned, articulated vehicles in general are referred to and not specifically articulated hualers. The vehicle 10 of FIG. 1B also comprises at least one propulsion source 12 as above and the hydraulic steering system 100.

Figure 2:
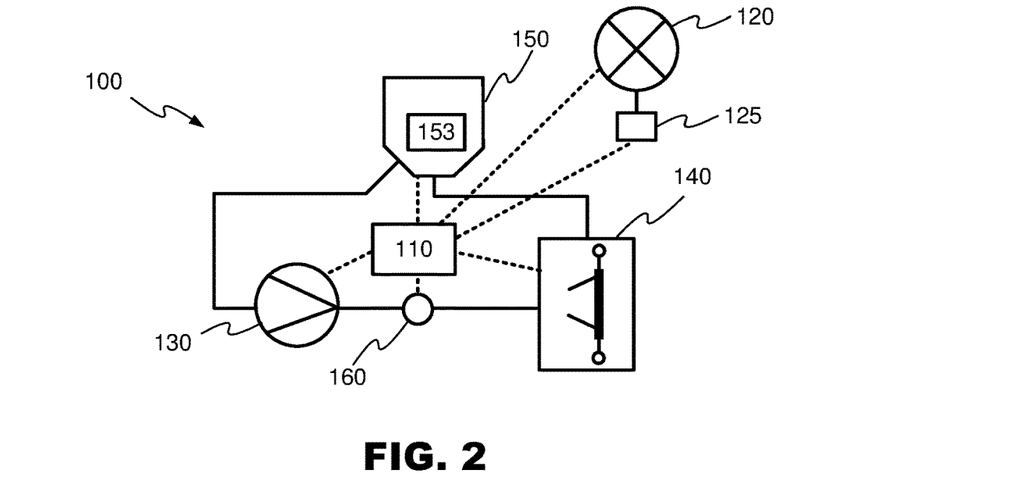
FIG. 2 is an exemplary hydraulic steering system according to an example.

With reference to FIG. 2, one example of the hydraulic steering system 100 according to the present disclosure will be presented. The hydraulic steering system 100 comprises a processor circuit 110. The processor circuit 110 may be any suitable processor circuit 110 and may be a distributed or local circuit and may comprise one or more processor devices or control units.

The processing circuit 110 is operatively connected to an SIU 120. The processor circuit 110 is configured to control a haptic feedback of the SIU 120. The SIU 120 may, in some examples, form part of the hydraulic steering system 100. The SIU 120 may be provided with an SIU interface 125 configured to facilitate communication between the processor circuit 110 the SIU.

The hydraulic steering system 100 further comprises one or more hydraulic pumps 130. These hydraulic pumps 130 are configured to drive the hydraulic steering system 100. That is to say, the hydraulic pumps 130 are configured to control a flow of hydraulic fluid in the hydraulic system 100. As will be further explained in later sections, the hydraulic pump 130 or hydraulic pumps 130 may be driven by any suitable power source of the vehicle 10.

The hydraulic steering system 100 is configured to control an articulated joint 140 of the vehicle 10. The hydraulic steering system 100 is hydraulically connected to the articulated joint 140. In some examples, the articulated joint 140 is comprised in the hydraulic steering system 100. The articulated joint 140 may be any suitable articulated joint 140 arranged to control a steering of a vehicle 10. The articulated joint 140 may be an articulation joint of the truck 10 of FIG. 1A arranged to control a steering angle of wheel of the truck 10. The articulated joint 140 may be an articulation joint of the articulated vehicle 10 of FIG. 1B arranged to control an articulation of the articulated vehicle 10.

The hydraulic steering system 100 may further comprise an oil sump 150. The oil sump 150 may serves as a reservoir for hydraulic fluid, ensuring that there is a sufficient supply of oil available to the hydraulic steering system 100. This is beneficial at it helps prevent loss of steering control due to low fluid levels. The oil in the oil sump 150 also contributes to cooling the hydraulic steering system 100 by dissipating heat generated by the movement of the hydraulic fluid through the system. This can help prevent overheating and damage to the hydraulic steering system 100. The oil sump 150 may be provided with one or more filtration devices 153. The filtration device 153 is advantageously arranged to filter the hydraulic fluid, i.e. the oil. The filter device 153 may be arranged to filter the oil upon entry and/or exit from the oil sump 150. The filter device 153 is advantageously configured to remove contaminants from the oil, such as dirt, debris, and/or metal shavings. This helps to protect the components of the hydraulic steering system 100 from damage and prolongs their life.

The hydraulic steering system 100 may further comprise one or more sensor devices 160. The sensor devices 160 may be any suitable sensor devices configured to sense, measure, detect or otherwise obtain operational data indicative of operational parameters of the hydraulic steering system. The operational data may will be further explained in further section of the present disclosure.

The skilled person will appreciate that the hydraulic steering system 100 presented herein is simplified for efficiency of disclosure. For instance, the SIU 120 is generally provided with a suitable torque providing device (e.g. a linear motor etc.). Further to this, gearings, valves etc. may be provided in the hydraulic steering system 100. The skilled person knows how to design a hydraulic steering system and understands what to include in a hydraulic steering system despite it not being mentioned herein. The features mentioned herein are features that contribute to the detailed understanding of the improving features presented herein.

The inventors behind the present disclosure has realized that haptic feedback of the SIU may be controlled based on a capacity of the hydraulic steering system 100. That is to say, the haptic feedback may depend on a current ability of the hydraulic system 100 to control the articulated joint 140. To present an extreme example, if the hydraulic pump 130 is broken, an available hydraulic steering capacity 115 (see FIG. 4) will be substantially zero, that is to say, the hydraulic steering system 100 will not be able to provide any torque to the articulated joint 140. In such an example, the haptic feedback is advantageously infinite, or at least at a maximum value.

Figure 4:
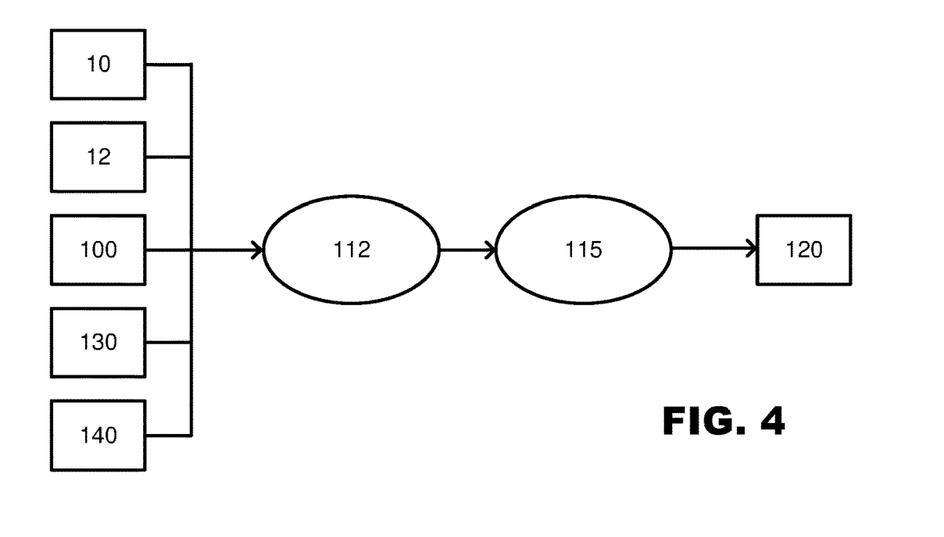
FIG. 4 is an exemplary flow chart of providing haptic feedback to a steering unit according to an example.

The available hydraulic steering capacity 115 may be a measure of an amount of hydraulic power currently available in the hydraulic steering system 100. The available hydraulic steering capacity 115 may be determined based one or more factors relating to the operation of the hydraulic steering system 100. As seen in FIG. 4, the available hydraulic steering capacity 115 may depend on one or more factors in the form of operational data 112 of the hydraulic steering system 100.

Current operational data relating to the hydraulic pump 130 is advantageously evaluated (by e.g. the sensor device 160) to determine operational data 112.

One exemplary operational data 112 may be a current hydraulic pressure (Pa). A hydraulic pressure that the hydraulic steering system 100 is currently operating at is a factor that may determine the amount of hydraulic power (steering capacity) available. An increase in hydraulic pressure increases the steering capacity.

Another exemplary operational data 112 may be a current hydraulic flow rate ($cm^3/s$). A current hydraulic flow rate that the hydraulic steering system 100 is currently operating at is a factor that may determine the amount of hydraulic power (steering capacity) available. An increase in hydraulic flow rate increases the steering capacity.

Another exemplary operational data 112 may be a current capacity of the hydraulic pump 130. The current capacity of the hydraulic pump 130 is one factor that may determine the amount of hydraulic power that is available in a hydraulic system. The pump capacity may be indicated in terms of the hydraulic flow rate and the hydraulic pressure. The higher the pump capacity, the more hydraulic power (steering capacity) is available.

A current fluid viscosity is another exemplary operational data 112. The fluid viscosity, or thickness, of the hydraulic fluid used in the hydraulic steering system 100 may affect the amount of hydraulic power available. Thicker fluids may reduce the flow rate and increase resistance, which can reduce the amount of hydraulic power (steering capacity) available.

The fluid viscosity may be affected by a temperature of the fluid. A current temperature of the hydraulic fluid is another exemplary operational data 112. Generally, an increase in temperature yields a decreased fluid viscosity which may reduce the amount of hydraulic power (steering capacity) available.

Figure 3:
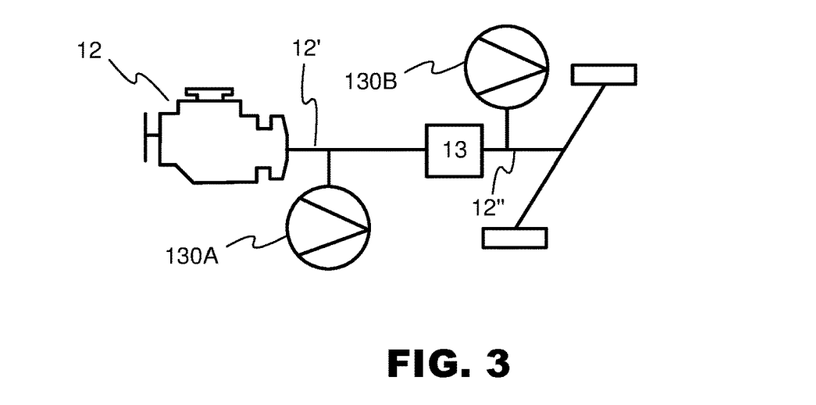
FIG. 3 is an exemplary drive arrangement of a hydraulic pump according to an example.

The available hydraulic steering capacity 115 may, as indicated above, depend on current operation of the hydraulic pump 130. As shown in FIG. 3, the hydraulic pump steering system 100 may comprise more than one hydraulic pump 130A, 130B. For safety and redundancy in order to ensure reliable steering, a first hydraulic pump 130A may be driven by a crankshaft 12' (or any other suitable member that rotates proportionally to a rotational speed of the propulsion source 12) of the vehicle 10 and second hydraulic pump 130B may be driven by a driveshaft 12" (or any other suitable member that rotates proportionally to a ground speed of the vehicle 10) of the vehicle 10. The driveshaft 12" is connected to a gearbox 13 of the vehicle 10 and located downstream from the gearbox 13 such that the gearbox 13 is arranged between the driveshaft 12" and the propulsion source 12. The first hydraulic pump 130a will provide a hydraulic pressure proportional to a rotational speed of the propulsion source 12. The higher the rotational speed of the propulsion source 12, the higher the steering capacity 115 of the hydraulic steering system 100 (and vice versa). The second hydraulic pump 130b will provide a hydraulic pressure proportional to a ground speed of the vehicle 10. The faster the vehicle 10 travels, the higher the steering capacity 115 of the hydraulic steering system 100 (and vice versa).

In FIG. 3, the first hydraulic pump 130A may generally be considered a primary hydraulic pump 130A as this will provide a steering capacity 115 as long as the propulsion source is running, even if the vehicle 10 is stationary. The second hydraulic pump 130B may generally be considered a secondary hydraulic pump 130B as this will only provide a steering capacity 115 when the vehicle 10 is moving. The secondary hydraulic pump 130B will ensure that a moving vehicle 10 may be controlled even if the primary hydraulic pump 130A malfunctions.

In some exemplary embodiments of the hydraulic steering system 100, only one of the first hydraulic pump 130A or the second hydraulic pump 130B is present.

From FIG. 3, it may be concluded that the available hydraulic steering capacity 115 may be determined based on operational data 112 relating to the propulsion source 12. To this end, the operational data 112 may comprise a rotational speed (rpm) of the propulsion source 12 of the vehicle 10.

From FIG. 3, it may further be concluded that the available hydraulic steering capacity 115 may be determined based on operational data 112 relating to a ground speed of the vehicle 10. To this end, the operational data 112 may comprise a current ground speed of the vehicle 10.

As indicated in FIG. 4, the hydraulic operational data 112 may be comprise data obtained from e.g. the vehicle 10 in general, the propulsion source 12 of the vehicle 10, the hydraulic steering system 100 in general, the hydraulic pump 130 of the hydraulic steering system 100, the articulated joint 140 of the vehicle 10 etc. The hydraulic operational data 112 is utilized to determine the available hydraulic steering capacity 115 of the vehicle 10 and the available hydraulic steering capacity 115 is utilized to determine the haptic feedback of the SIU 120.

Figure 5:
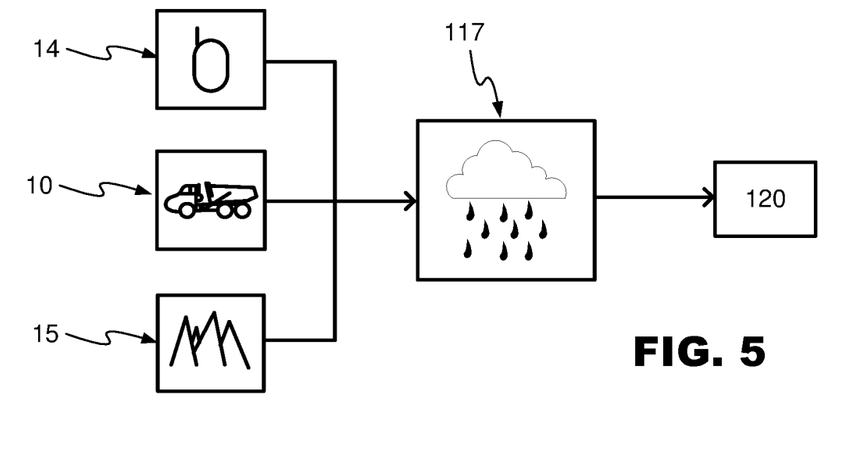
FIG. 5 is an exemplary flow chart of providing haptic feedback to a steering unit according to an example.

The inventors behind the present disclosure have further realized that it may be advantageous to utilize further data in order to determine the haptic feedback to be exerted by the SIU 120. Such data may, as shown in FIG. 5, comprise environmental data 117. The environmental data 117 may be any suitable data describing a current environment of the vehicle. The environmental data 117 may be obtained from one or more sensors or devices on board the vehicle 10. Such sensors or devices may be an anti-spin circuitry, a temperature sensor, an inclination sensor, road condition sensor etc. The environmental data 117 may comprise weather data obtained by e.g. a communications device 14 of the vehicle 10 and/or one or more sensors or devices of the vehicle 10. The environmental data 117 may comprise topology data 15 obtained by e.g. the communications device 14 of the vehicle 10 and/or one or more sensors or devices on board the vehicle 10.

As previously indicated, the haptic feedback functionality of an SBW system is advantageously used to provide an operator of the vehicle 10 with information on a current status of the steering. That is to say, what the current capabilities of the vehicle are and to ensure that the operator is controlling the vehicle 10 in a harmless way. The present disclosure has taught the skilled person to comprise more data when determining the haptic feedback in order to give the operator a better understanding of how the vehicle 10 may, and should, be handled in every situation. To just base the haptic feedback on the rotational speed of the SIU 120 has been tested, evaluated and deemed to be insufficient for most use cases. However, by comprising the steering capacity 115 significantly increases the quality of the haptic feedback and reduces, or even removes, a risk that the current steering angle of the SIU does not reflect a current steering angle of the vehicle 10.

In the following, a non-limiting implementation example of the teachings of the present disclosure will be given. Define a rotational speed of the SIU 120 as dθ(t)/dt, a haptic feedback, i.e. a feedback torque as $\tau_{fb}$, a current hydraulic flow as $Q_{hyd}(t)$, the current hydraulic power as $P_{hyd}(t)$ and the vehicle velocity as v(t). The feedback torque $\tau_{fb}(t)$ may be calculated as $$\tau_{fb}(t) = f\left(\frac{d\theta(t)}{dt}, Q_{hyd}(t), P_{hyd}(t), v(t)\right)$$

at each time point t. As mentioned, in hydraulic steering solutions used in some vehicles 10, the hydraulic flow and power depends on a speed of the propulsion source 12. The hydraulic power and flow are used to indicate the hydraulic capacity 115 at each time point.

More generally, the steering capacity 115 may be defined from the hydraulic flow and power. For other steering solutions, the steering capacity 115 may be defined and used to calculate the haptic feedback. If the steering capacity 115 is defined as dφ(t)/dt, the haptic feedback, i.e. the feedback torque is defined as $$\tau_{fb}(t) = f\left(\frac{d\theta(t)}{dt}, \frac{d\varphi(t)}{dt}, v(t)\right)$$

at each time point t.

As mentioned e.g. in reference to FIG. 5, the haptic feedback to be provided to the SIU 120 may be determined further based on surrounding conditions, i.e. environmental data 117. That is to say, the environmental data 117 may describe that the vehicle 10 is currently in deep mud which may cause an increase in haptic feedback.

Figure 6:
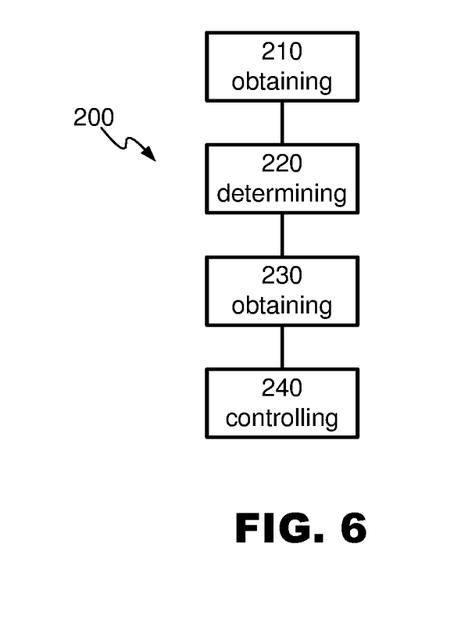
FIG. 6 is an exemplary method of providing haptic feedback to a steering unit according to an example.

In FIG. 6, an exemplary method 200 of determining the haptic feedback exerted by an SIU 120 is shown. The method 200 may be performed by any suitable means. Advantageously, a processor circuit 110 as the one previously presented may be configured to cause execution of one or more features of the method 200. In some examples, the processor circuit 110 is configured to execute one or more of the features of the method 200. The method 200 will be briefly described outlining the main features of the method 200. However, it should be mentioned that the method 200 may be amended to comprise any suitable feature or example presented herein.

The method 200 comprises obtaining 230 the available hydraulic steering capacity 115 of the vehicle 10. The available hydraulic steering capacity 115 may comprise any indicator and/or data relevant for the steering of the vehicle 10 as presented herein. The available hydraulic steering capacity 115 may be obtained in any suitable means presented herein.

The method further comprises controlling 240 the haptic feedback exerted on the SIU 120 based on the obtained hydraulic steering capacity 115. The control of the haptic feedback exerted on the SIU 120 may, as previously indicated, be provided by any suitable means acting upon the SIU 120.

Optionally, the method 200 may further comprise obtaining 210 hydraulic operational data 112 of the hydraulic steering system 100, and determining 220 the available hydraulic steering capacity 115 based on the hydraulic operational data 112. The hydraulic operational data 112 may be any suitable hydraulic operational data 112 as indicated in the present disclosure.

The method 200 is shown in a specific order but this is for illustrative purposes only. The skilled person will appreciate that the order of some features of the method 200 may be suitably interchanged.

Figure 7:
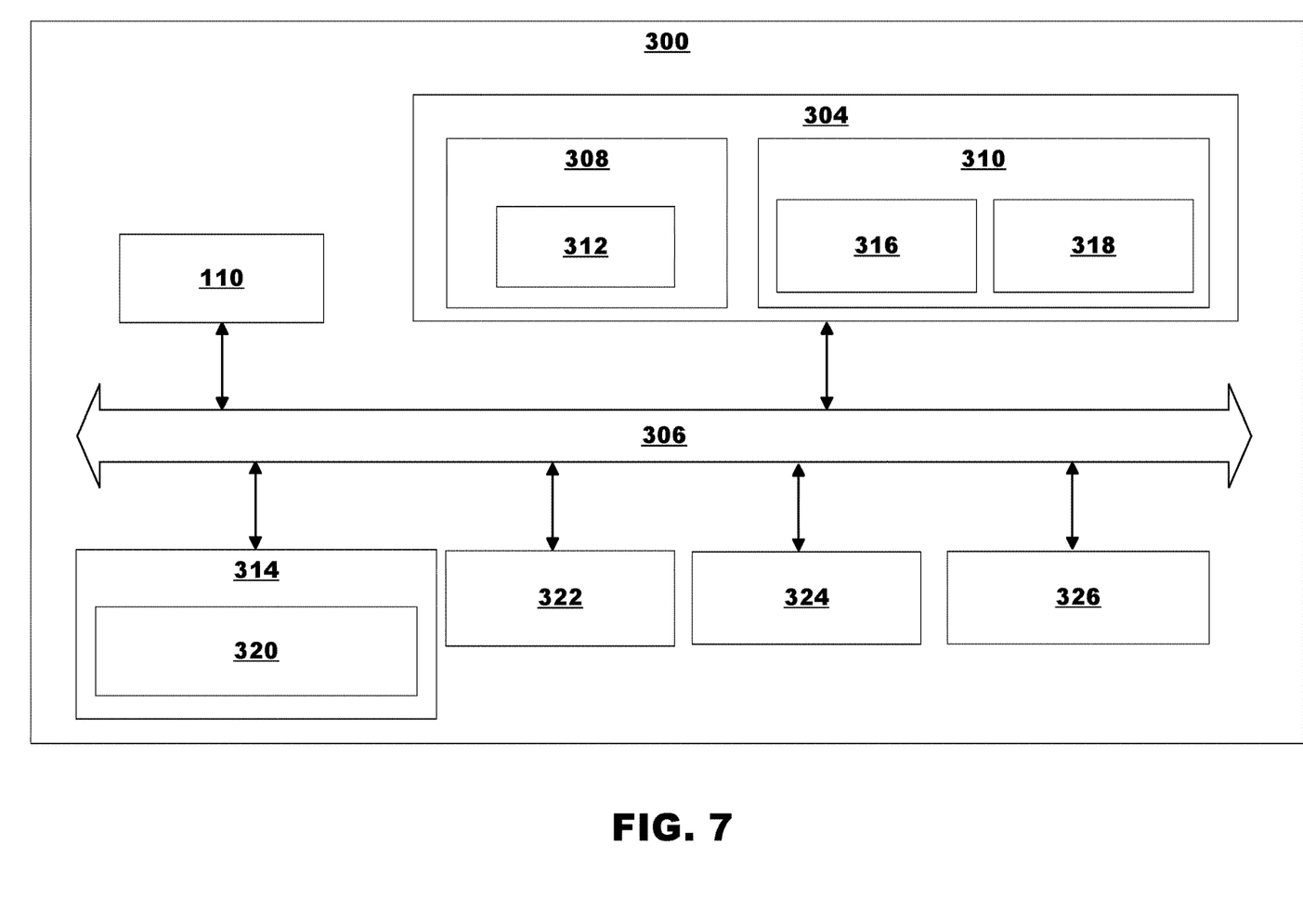
FIG. 7 is a schematic diagram of an exemplary computer system for implementing examples disclosed herein, according to one example.

FIG. 7 is a schematic diagram of a computer system 300 for implementing examples disclosed herein. The computer system 300 is adapted to execute instructions from a computer-readable medium to perform these and/or any of the functions or processing described herein. The computer system 300 may be connected (e.g., networked) to other machines in a LAN, an intranet, an extranet, or the Internet. While only a single device is illustrated, the computer system 300 may include any collection of devices that individually or jointly execute a set (or multiple sets) of instructions to perform any one or more of the methodologies discussed herein. Accordingly, any reference in the disclosure and/or claims to a computer system, computing system, computer device, computing device, control system, control unit, electronic control unit (ECU), processor device, processing circuitry, etc., includes reference to one or more such devices to individually or jointly execute a set (or multiple sets) of instructions to perform any one or more of the methodologies discussed herein. For example, control system may include a single control unit or a plurality of control units connected or otherwise communicatively coupled to each other, such that any performed function may be distributed between the control units as desired. Further, such devices may communicate with each other or other devices by various system architectures, such as directly or via a Controller Area Network (CAN) bus, etc.

The computer system 300 may comprise at least one computing device or electronic device capable of including firmware, hardware, and/or executing software instructions to implement the functionality described herein. The computer system 300 may include processing circuitry 110 (e.g., processing circuitry including one or more processor devices or control units), a memory 304, and a system bus 306. The computer system 300 may include at least one computing device having the processing circuitry 110. The system bus 306 provides an interface for system components including, but not limited to, the memory 304 and the processing circuitry 110. The processing circuitry 110 may include any number of hardware components for conducting data or signal processing or for executing computer code stored in memory 304. The processing circuitry 110 may, for example, include a general-purpose processor, an application specific processor, a Digital Signal Processor (DSP), an Application Specific Integrated Circuit (ASIC), a Field Programmable Gate Array (FPGA), a circuit containing processing components, a group of distributed processing components, a group of distributed computers configured for processing, or other programmable logic device, discrete gate or transistor logic, discrete hardware components, or any combination thereof designed to perform the functions described herein. The processing circuitry 110 may further include computer executable code that controls operation of the programmable device.

The system bus 306 may be any of several types of bus structures that may further interconnect to a memory bus (with or without a memory controller), a peripheral bus, and/or a local bus using any of a variety of bus architectures. The memory 304 may be one or more devices for storing data and/or computer code for completing or facilitating methods described herein. The memory 304 may include database components, object code components, script components, or other types of information structure for supporting the various activities herein. Any distributed or local memory device may be utilized with the systems and methods of this description. The memory 304 may be communicably connected to the processing circuitry 110 (e.g., via a circuit or any other wired, wireless, or network connection) and may include computer code for executing one or more processes described herein. The memory 304 may include non-volatile memory 308 (e.g., read-only memory (ROM), erasable programmable read-only memory (EPROM), electrically erasable programmable read-only memory (EEPROM), etc.), and volatile memory 310 (e.g., random-access memory (RAM)), or any other medium which can be used to carry or store desired program code in the form of machine-executable instructions or data structures and which can be accessed by a computer or other machine with processing circuitry 110. A basic input/output system (BIOS) 312 may be stored in the non-volatile memory 308 and can include the basic routines that help to transfer information between elements within the computer system 300.

The computer system 300 may further include or be coupled to a non-transitory computer-readable storage medium such as the storage device 314, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 314 and other drives associated with computer-readable media and computer-usable media may provide non-volatile storage of data, data structures, computer-executable instructions, and the like.

Computer-code which is hard or soft coded may be provided in the form of one or more modules. The module(s) can be implemented as software and/or hard-coded in circuitry to implement the functionality described herein in whole or in part. The modules may be stored in the storage device 314 and/or in the volatile memory 310, which may include an operating system 316 and/or one or more program modules 318. All or a portion of the examples disclosed herein may be implemented as a computer program 320 stored on a transitory or non-transitory computer-usable or computer-readable storage medium (e.g., single medium or multiple media), such as the storage device 314, which includes complex programming instructions (e.g., complex computer-readable program code) to cause the processing circuitry 110 to carry out actions described herein. Thus, the computer-readable program code of the computer program 320 can comprise software instructions for implementing the functionality of the examples described herein when executed by the processing circuitry 110. In some examples, the storage device 314 may be a computer program product (e.g., readable storage medium) storing the computer program 320 thereon, where at least a portion of a computer program 320 may be loadable (e.g., into a processor) for implementing the functionality of the examples described herein when executed by the processing circuitry 110. The processing circuitry 110 may serve as a controller or control system for the computer system 300 that is to implement the functionality described herein.

The computer system 300 may include an input device interface 322 configured to receive input and selections to be communicated to the computer system 300 when executing instructions, such as from a keyboard, mouse, touch-sensitive surface, etc. Such input devices may be connected to the processing circuitry 110 through the input device interface 322 coupled to the system bus 306 but can be connected through other interfaces, such as a parallel port, an Institute of Electrical and Electronic Engineers (IEEE) 1394 serial port, a Universal Serial Bus (USB) port, an IR interface, and the like. The computer system 300 may include an output device interface 324 configured to forward output, such as to a display, a video display unit (e.g., a liquid crystal display (LCD) or a cathode ray tube (CRT)). The computer system 300 may include a communications interface 326 suitable for communicating with a network as appropriate or desired.

The operational actions described in any of the exemplary aspects herein are described to provide examples and discussion. The actions may be performed by hardware components, may be embodied in machine-executable instructions to cause a processor to perform the actions, or may be performed by a combination of hardware and software. Although a specific order of method actions may be shown or described, the order of the actions may differ. In addition, two or more actions may be performed concurrently or with partial concurrence.

In the following, a list of numbered examples will be presented:

Example 1. A hydraulic steering system 100 comprising a steering input unit, SIU, 120 and a processing circuitry 110 configured to control a haptic feedback exerted by the SIU 120, wherein the processing circuitry 110 is configured to: obtain an available hydraulic steering capacity 115 of the hydraulic steering system 100, and control the haptic feedback exerted on the SIU 120 based on the obtained hydraulic steering capacity 115.

Example 2. The hydraulic steering system 100 of example 1, wherein obtaining the available hydraulic steering capacity 115 comprises: obtaining hydraulic operational data 112 of the hydraulic steering system 100, and determining the available hydraulic steering capacity 115 based on the hydraulic operational data 112.

Example 3. The hydraulic steering system 100 of example 2, wherein the hydraulic operational data 112 comprises a current hydraulic power of the hydraulic steering system 100.

Example 4. The hydraulic steering system 100 of example 2 or 3, wherein the hydraulic operational data 112 comprises a current hydraulic flow of the hydraulic steering system 100.

Example 5. The hydraulic steering system 100 of any one of examples 2 to 4, wherein the hydraulic operational data 112 comprises a current speed of a hydraulic pump 130 driving the hydraulic steering system 100.

Example 6. The hydraulic steering system 100 of any one of the preceding examples, wherein the hydraulic steering system 100 is a steer by wire (SBW) system.

Example 7. The hydraulic steering system 100 of any one of the preceding examples, wherein control of the haptic feedback comprises controlling a torque exerted on the SIU 120.

Example 8. The hydraulic steering system 100 of any one of the preceding examples, wherein the processing circuitry 110 is further configured to obtain environmental data 117 and control the haptic feedback exerted on the SIU 120 also based on the environmental data 117.

Example 9. The hydraulic steering system 100 of example 8, wherein the environmental data 117 comprises one or more of a road condition, a weather condition and/or topology data.

Example 10. The hydraulic steering system 100 of example 1, wherein obtaining the available hydraulic steering capacity 115 comprises obtaining hydraulic operational data 112 of the hydraulic steering system 100 and determining the available hydraulic steering capacity 115 based on the hydraulic operational data 112, the hydraulic operational data 112 comprises a current hydraulic power of the hydraulic steering system 100, a current hydraulic flow of the hydraulic steering system 100 and a current speed of a hydraulic pump 130 driving the hydraulic steering system 100; the hydraulic steering system 100 is a SBW system; control of the haptic feedback comprises controlling a torque exerted on the SIU 120; the processing circuitry is further configured to obtain environmental data 117 and control the haptic feedback exerted on the SIU 120 also based on the environmental data 117, the environmental data 117 comprises one or more of a road condition, a weather condition and/or topology data.

Example 11. A vehicle 10 comprising a hydraulic steering system 100 comprising a steering input unit, SIU, and a processing circuitry 110 configured to control a haptic feedback exerted the SIU 120, wherein the processing circuitry is configured to: obtain an available hydraulic steering capacity 115 of the vehicle 10, and control the haptic feedback exerted on the SIU 120 based on the obtained hydraulic steering capacity 115.

Example 12. The vehicle 10 of example 11, wherein the hydraulic steering system 100 is the hydraulic steering system 100 of any one of examples 2 to 10.

Example 13. The vehicle 10 of example 11 or 12, wherein the hydraulic steering system 100 comprises at least one hydraulic pump 130 arranged to be driven by a propulsion source 12 of the vehicle 10.

Example 14. The vehicle 10 of example 13, wherein at least one hydraulic pump 130 is driven proportionally to a ground speed of the vehicle 10 and the hydraulic operational data 112 comprises a current ground speed of the vehicle 10.

Example 15. The vehicle 10 of example 13 or 14, wherein at least one hydraulic pump 130 is driven proportionally to a rotational speed of the propulsion source 12 and the hydraulic operational data 112 comprises a current rotational speed of the propulsion source 12.

Example 16. The vehicle 10 of any one of examples 11 to 15, wherein the vehicle is an articulated vehicle.

Example 17. A method 200 of determining a haptic feedback exerted by a SIU 120 of a hydraulic steering system 100, the method comprising: obtaining 230 an available hydraulic steering capacity 115 of the vehicle 10, and controlling 240 the haptic feedback exerted on the SIU 120 based on the obtained hydraulic steering capacity 115.

Example 18. The method 200 of example 17, wherein obtaining the available hydraulic steering capacity 115 comprises: obtaining 210 hydraulic operational data 112 of the hydraulic steering system 100, and determining 220 the available hydraulic steering capacity 115 based on the hydraulic operational data 112.

Example 19. The method of example 18, wherein the hydraulic operational data 112 comprises a current hydraulic power of the hydraulic steering system 100.

Example 20. The method 200 of example 18 or 19, wherein the hydraulic operational data 112 comprises a current hydraulic flow of the hydraulic steering system 100.

Example 21. The hydraulic steering system 100 of any one of examples 18 to 20, wherein the hydraulic operational data 112 comprises a current speed of a hydraulic pump 130 driving the hydraulic steering system 100.

The terminology used herein is for the purpose of describing particular aspects only and is not intended to be limiting of the disclosure. As used herein, the singular forms "a," "an," and "the" are intended to include the plural forms as well, unless the context clearly indicates otherwise. As used herein, the term "and/or" includes any and all combinations of one or more of the associated listed items. It will be further understood that the terms "comprises," "comprising," "includes," and/or "including" when used herein specify the presence of stated features, integers, actions, steps, operations, elements, and/or components, but do not preclude the presence or addition of one or more other features, integers, actions, steps, operations, elements, components, and/or groups thereof.

It will be understood that, although the terms first, second, etc., may be used herein to describe various elements, these elements should not be limited by these terms. These terms are only used to distinguish one element from another. For example, a first element could be termed a second element, and, similarly, a second element could be termed a first element without departing from the scope of the present disclosure.

Relative terms such as "below" or "above" or "upper" or "lower" or "horizontal" or "vertical" may be used herein to describe a relationship of one element to another element as illustrated in the Figures. It will be understood that these terms and those discussed above are intended to encompass different orientations of the device in addition to the orientation depicted in the Figures. It will be understood that when an element is referred to as being "connected" or "coupled" to another element, it can be directly connected or coupled to the other element, or intervening elements may be present. In contrast, when an element is referred to as being "directly connected" or "directly coupled" to another element, there are no intervening elements present.

Unless otherwise defined, all terms (including technical and scientific terms) used herein have the same meaning as commonly understood by one of ordinary skill in the art to which this disclosure belongs. It will be further understood that terms used herein should be interpreted as having a meaning consistent with their meaning in the context of this specification and the relevant art and will not be interpreted in an idealized or overly formal sense unless expressly so defined herein.

It is to be understood that the present disclosure is not limited to the aspects described above and illustrated in the drawings; rather, the skilled person will recognize that many changes and modifications may be made within the scope of the present disclosure and appended claims. In the drawings and specification, there have been disclosed aspects for purposes of illustration only and not for purposes of limitation, the scope of the disclosure being set forth in the following claims.

The invention claimed is:

1. A hydraulic steering system comprising a steering input unit, SIU, and a processing circuitry configured to control a haptic feedback exerted by the SIU, wherein the processing circuitry is configured to:
   obtain an available hydraulic steering capacity of the hydraulic steering system, and
   control the haptic feedback exerted on the SIU based on the obtained hydraulic steering capacity.

2. The hydraulic steering system of claim 1, wherein obtaining the available hydraulic steering capacity comprises:
   obtaining hydraulic operational data of the hydraulic steering system, and
   determining the available hydraulic steering capacity based on the hydraulic operational data.

3. The hydraulic steering system of claim 2, wherein the hydraulic operational data comprises a current hydraulic power of the hydraulic steering system.

4. The hydraulic steering system of claim 2, wherein the hydraulic operational data comprises a current hydraulic flow of the hydraulic steering system.

5. The hydraulic steering system of claim 2, wherein the hydraulic operational data comprises a current speed of a hydraulic pump driving the hydraulic steering system.

6. The hydraulic steering system of claim 1, wherein the hydraulic steering system is a steer by wire, SBW, system.

7. The hydraulic steering system of claim 1, wherein control of the haptic feedback comprises controlling a torque exerted on the SIU.

8. The hydraulic steering system of claim 1, wherein the processing circuitry is further configured to obtain environmental data and control the haptic feedback exerted on the SIU also based on the environmental data.

9. The hydraulic steering system of claim 8, wherein the environmental data comprises one or more of a road condition, a weather condition and/or topology data.

10. The hydraulic steering system of claim 1, wherein obtaining the available hydraulic steering capacity comprises obtaining hydraulic operational data of the hydraulic steering system and determining the available hydraulic steering capacity based on the hydraulic operational data;

the hydraulic operational data comprising a current hydraulic power of the hydraulic steering system, a current hydraulic flow of the hydraulic steering system and a current speed of a hydraulic pump driving the hydraulic steering system; the hydraulic steering system is a SBW system; control of the haptic feedback comprises controlling a torque exerted on the SIU; the processing circuitry is further configured to obtain environmental data and control the haptic feedback exerted on the SIU also based on the environmental data, the environmental data comprises one or more of a road condition, a weather condition and/or topology data.

11. A vehicle comprising a hydraulic steering system comprising a steering input unit, SIU, and a processing circuitry configured to control a haptic feedback exerted the SIU, wherein the processing circuitry is configured to:
   obtain an available hydraulic steering capacity of the vehicle, and
   control the haptic feedback exerted on the SIU based on the obtained hydraulic steering capacity.

12. The vehicle of claim 11, wherein obtaining the available hydraulic steering capacity comprises:
   obtaining hydraulic operational data of the hydraulic steering system, and
   determining the available hydraulic steering capacity based on the hydraulic operational data.

13. The vehicle of claim 11, wherein the hydraulic steering system comprises at least one hydraulic pump arranged to be driven by a propulsion source of the vehicle.

14. The vehicle of claim 13, wherein at least one hydraulic pump is driven proportionally to a ground speed of the vehicle and the hydraulic operational data comprises a current ground speed of the vehicle.

15. The vehicle of claim 13, wherein at least one hydraulic pump is driven proportionally to a rotational speed of the propulsion source and the hydraulic operational data comprises a current rotational speed of the propulsion source.

16. The vehicle of claim 11, wherein the vehicle is an articulated vehicle.

17. The vehicle of claim 11, wherein the hydraulic steering system comprises at least one hydraulic pump arranged to be driven by a propulsion source of the vehicle; wherein at least one hydraulic pump is driven proportionally to a ground speed of the vehicle and the hydraulic operational data comprises a current ground speed of the vehicle; wherein at least one hydraulic pump is driven proportionally to a rotational speed of the propulsion source and the hydraulic operational data comprises a current rotational speed of the propulsion source; wherein the vehicle is an articulated vehicle.

18. A method of determining a haptic feedback exerted by an SIU of a hydraulic steering system, the method comprising:
   obtaining an available hydraulic steering capacity of the vehicle, and
   controlling the haptic feedback exerted on the SIU based on the obtained hydraulic steering capacity.

19. The method of claim 18, wherein obtaining the available hydraulic steering capacity comprises:
   obtaining hydraulic operational data of the hydraulic steering system, and
   determining the available hydraulic steering capacity based on the hydraulic operational data.

20. The method of claim 18, wherein the hydraulic operational data comprises at least one of a current hydraulic power of the hydraulic steering system, a current hydraulic flow of the hydraulic steering system and/or a current speed of a hydraulic pump driving the hydraulic steering system.

* * * * *